May 14, 1963
J. C. CARTER ET AL
3,089,840
NUCLEAR POWER PLANT
Filed Sept. 28, 1961
6 Sheets-Sheet 1
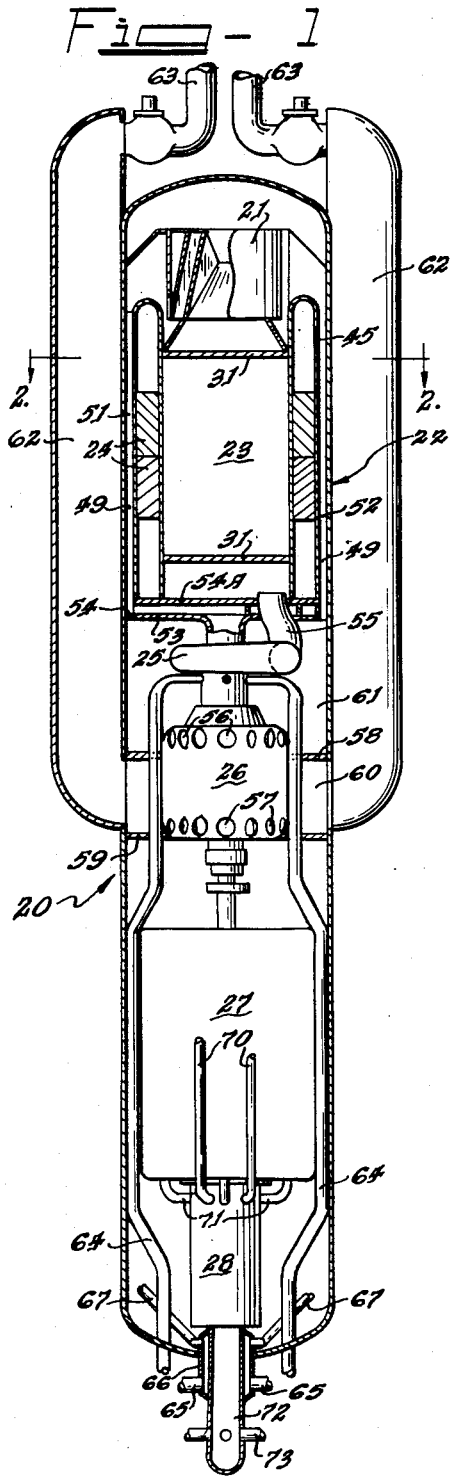
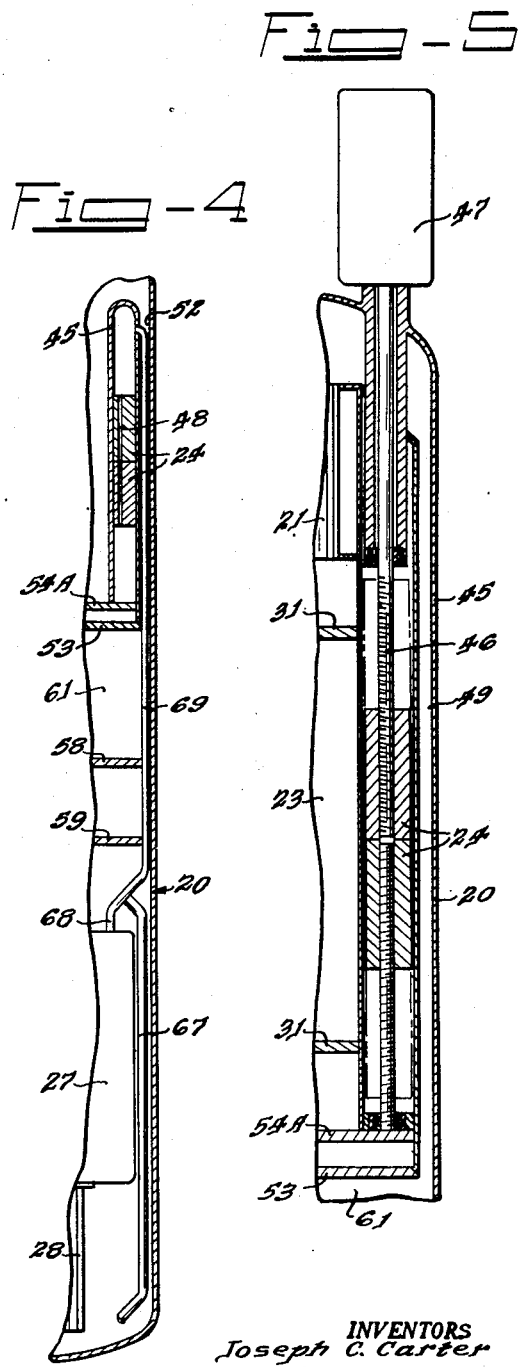
INVENTORS
Joseph C. Carter
Robert H. Armstrong
Marion J. Janicke
By:
Attorney

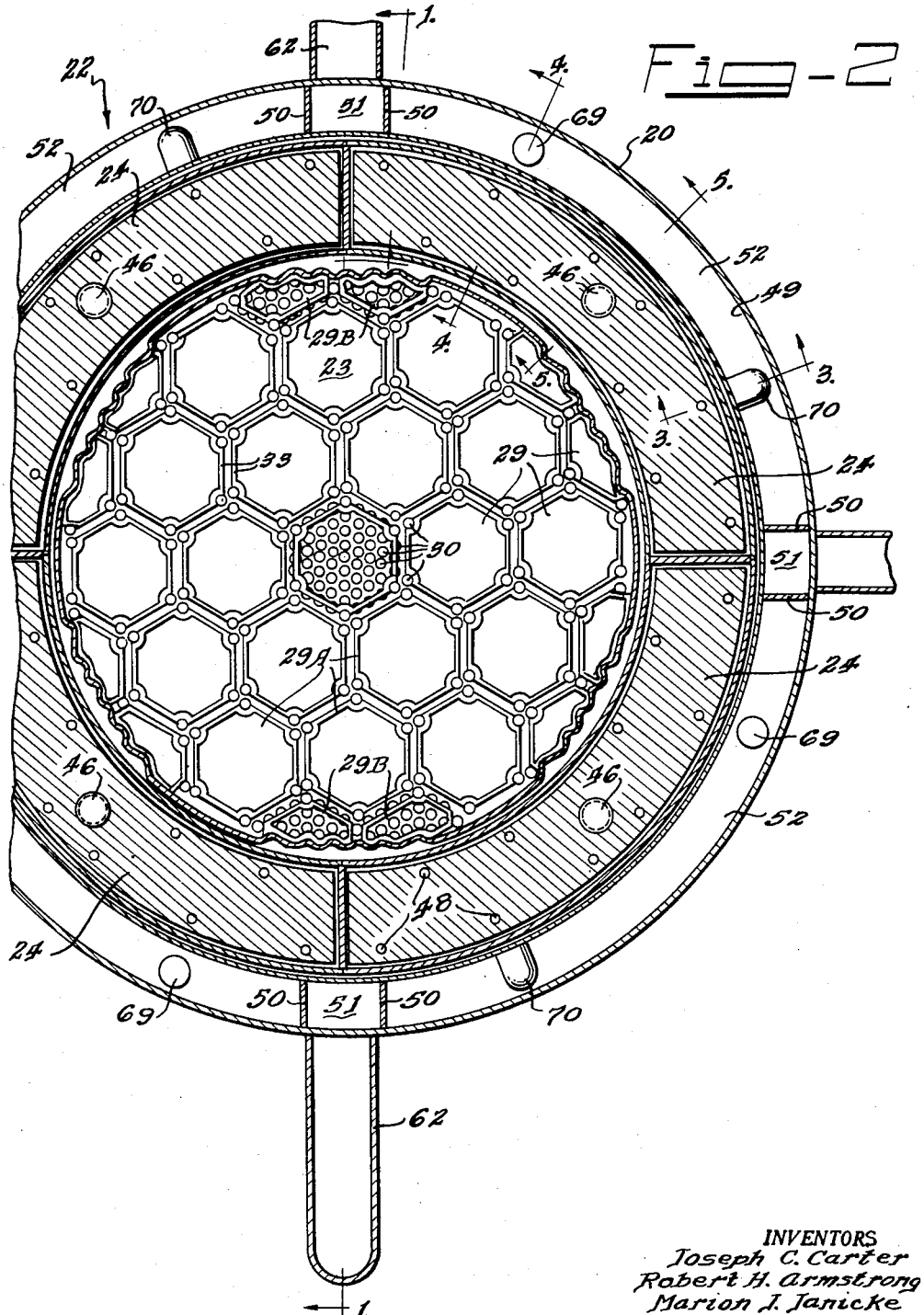

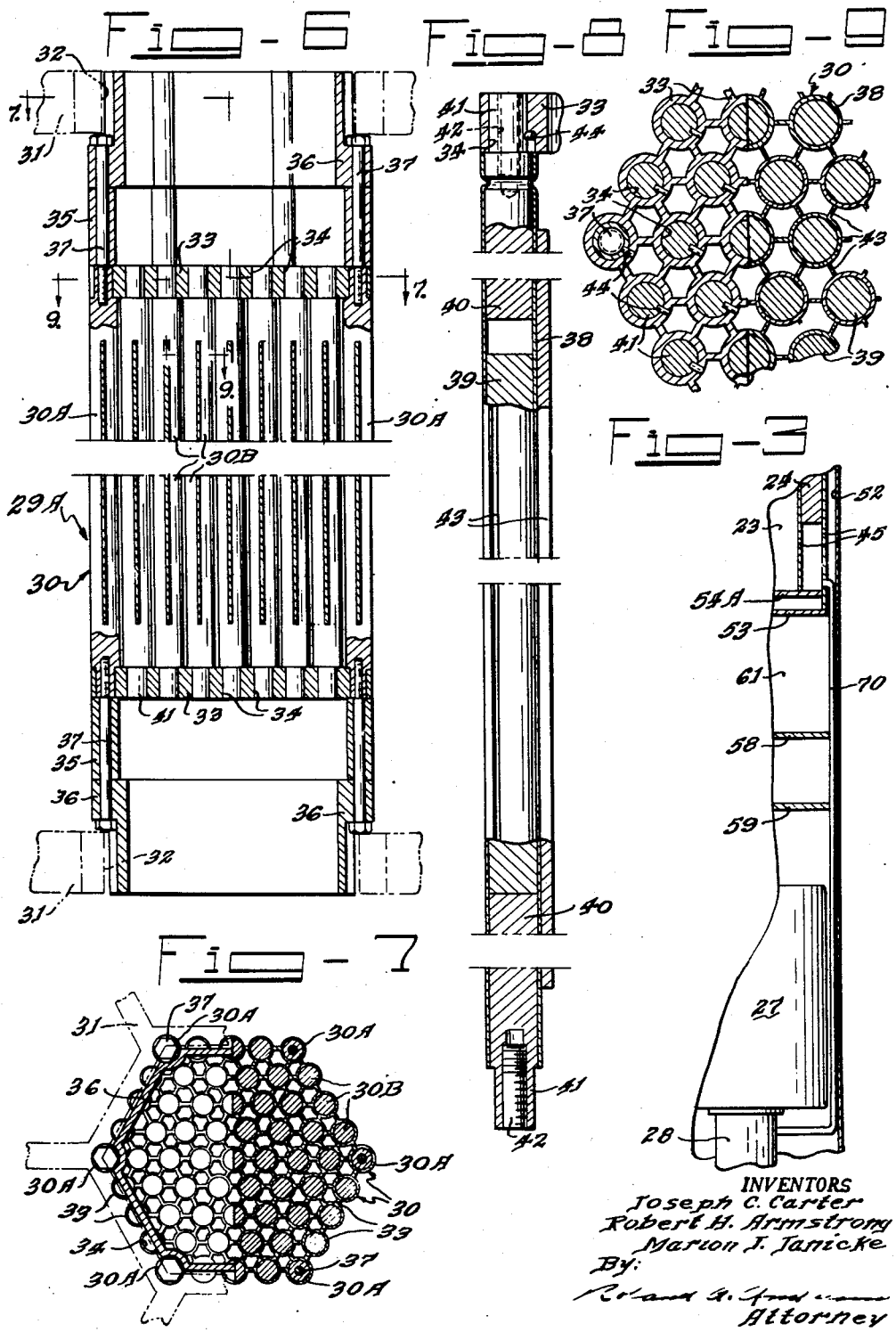

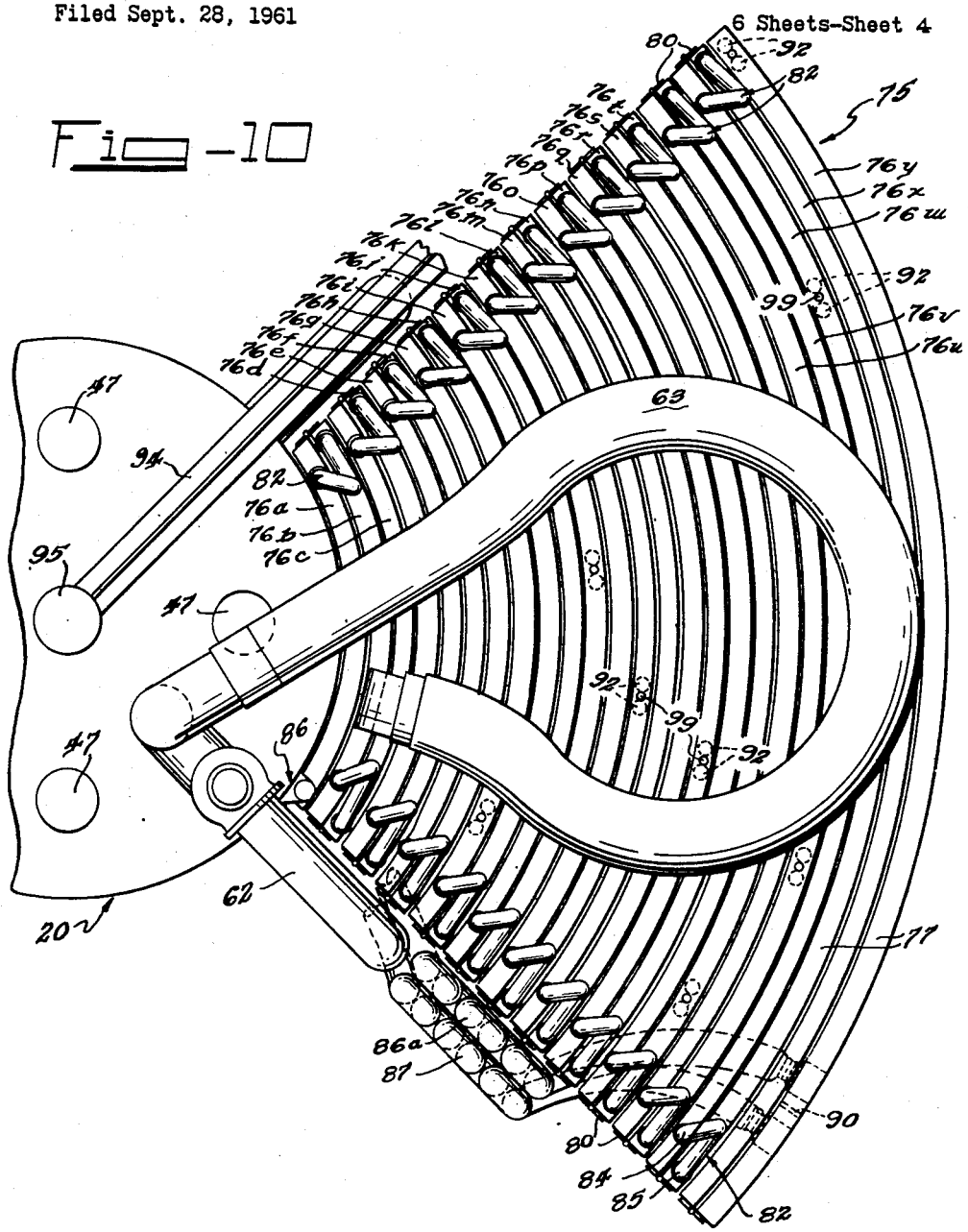

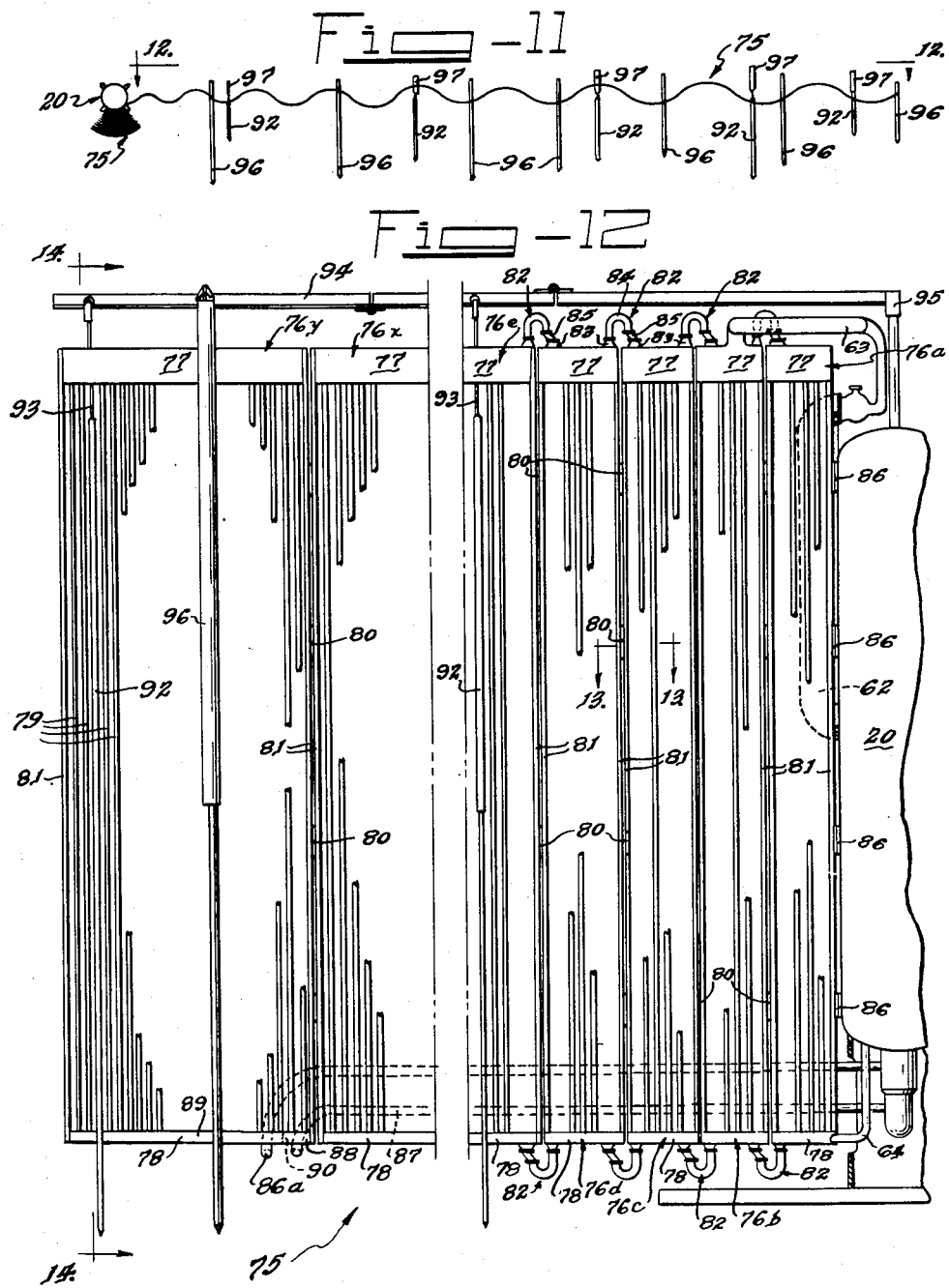

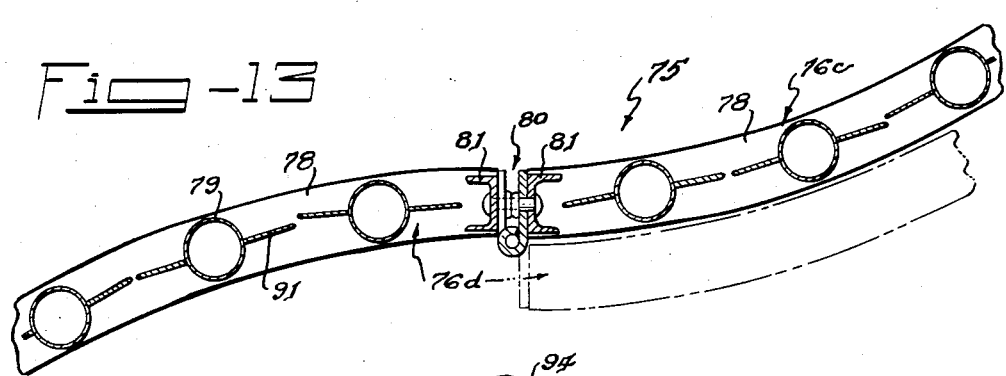
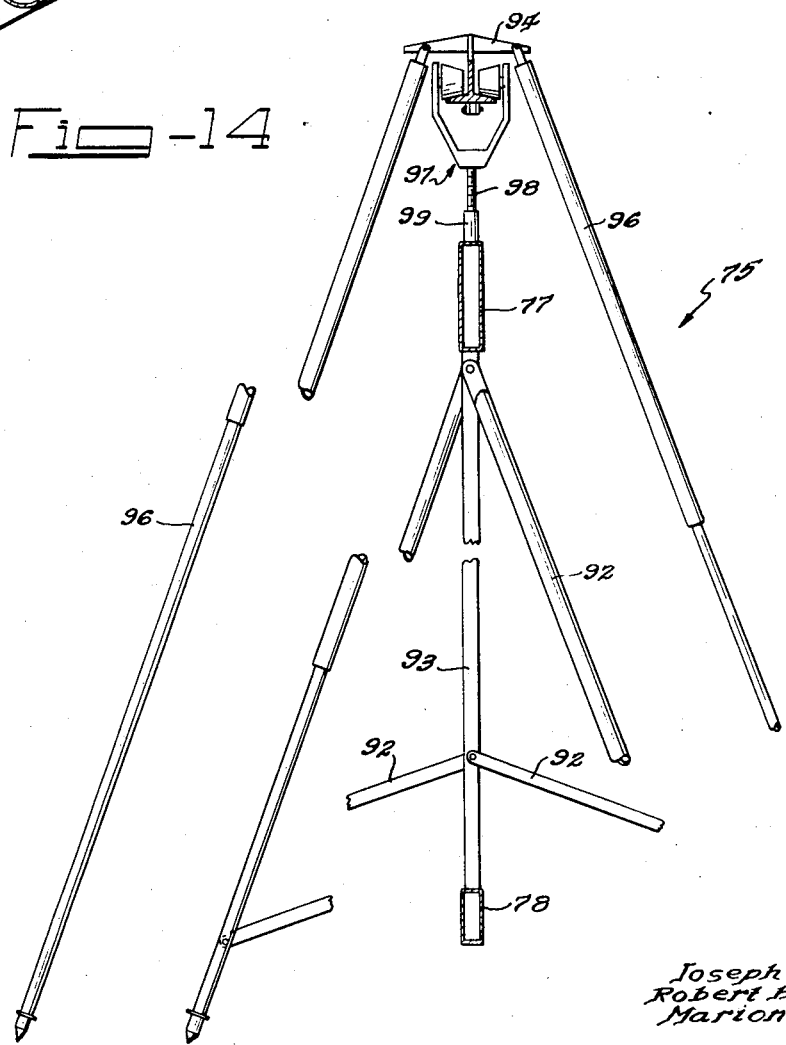

United States Patent Office 3,089,840
Patented May 14, 1963

3,089,840
NUCLEAR POWER PLANT
Joseph C. Carter, Elmhurst, Robert H. Armstrong, Park Forest, and Marion J. Janicke, Downers Grove, Ill., assignors to the United States of America as represented by the United States Atomic Energy Commission
Filed Sept. 28, 1961, Ser. No. 141,553
3 Claims. (Cl. 204—193.2)

This invention relates to a nuclear power plant. In more detail the invention relates to a nuclear power plant consisting of a fast reactor in a direct cycle with a mercury vapor turbine, which power plant is designed for use in an environment where cooling of the mercury vapor is difficult. The invention also relates to a radiator for such a power plant which can be transported in compact form and then be extended for use.

One example of an environment where cooling is difficult is an airless environment such as on the moon. In an airless environment the only reasonable means for removing the heat of condensation of the mercury is by radiation to space and to the surface of the moon.

Another example of an environment where cooling of the mercury vapor is difficult is a desert area where the average temperature is high and no large supply of water for cooling exists.

Nuclear power plants are uniquely suitable for use as a source of power in remote locations because of their high specific power and the low cost of transportation of fuel. Any organized expedition to the moon expecting to stay there an appreciable length of time must be provided with a power plant. It is natural to propose that a nuclear-powered electric plant be used as the power source for the First Lunar Scientific and Military Expedition of the United States of America. Obviously, the power plant to be used on the moon should be compact, relatively light in weight, and capable of automatic operation, and, overriding all other considerations, it must be reliable.

A nuclear power plant suitable for use on the moon is also suitable for use on the earth and the same features which make it effective on the moon make it effective as a compact power source for use in desert areas on the earth. The nuclear power plant according to the present invention can, for example, be transported by an army maneuvering in a desert area and set up in the desert area. In such areas water for cooling is difficult to obtain and the ambient temperatures typically attained in the summer make it difficult to condense the working fluid by exposure thereof to the ambient temperature.

The nuclear reactor per se is also useful as a compact heat source for nuclear propulsion and the condenser per se can be used with other mercury boilers.

It is accordingly an object of the present invention to develop a compact, reliable nuclear power plant which can be used in remote locations where condensation of the working fluid for the power plant is difficult.

It is a more detailed object of the present invention to develop a nuclear power plant which can be operated in the absence of an atmosphere.

It is another object of the present invention to develop a novel radiator which can be transported long distances in compact form and can then be unfolded for use.

These and other objects of the present invention are attained by a nuclear power plant incorporating a boiling-mercury nuclear reactor, a mercury-vapor turbine, a generator, and a condenser for spent mercury vapor. The condenser is designed so that it forms a compact package with the reactor for transportation and then can be unfolded to provide a large area for radiative loss of heat.

The invention will next be described with reference to the accompanying drawings wherein:

FIG. 1 is a vertical cross-sectional view of a portion of a nuclear power plant according to the present invention taken in the direction of the arrows 1—1 in FIG. 2, FIG. 2 is a horizontal cross-sectional view taken in the direction of the arrows 2—2 in FIG. 1, FIG. 3 is a partial vertical cross-sectional view taken in the direction of the arrows 3—3 in FIG. 2, FIG. 4 is a partial vertical cross-sectional view taken in the direction of the arrows 4—4 in FIG. 2, FIG. 5 is a partial vertical cross-sectional view taken in the direction of the arrows 5—5 in FIG. 2, FIG. 6 is a vertical sectional view of a fuel assembly for the nuclear power plant, FIG. 7 is a horizontal sectional view taken in the direction of the arrows 7—7 in FIG. 6, FIG. 8 is a vertical sectional view of a corner fuel element from the fuel assembly, FIG. 9 is a horizontal sectional view taken in the direction of the arrows 9—9 in FIG. 6, FIG. 10 is a plan view of the nuclear power plant showing one wing of the radiator in compact form and its connections to the reactor, FIG. 11 is a diagrammatic plan view of the power plant which shows the radiator in open position, FIG. 12 is an enlarged partly broken away vertical elevational view taken in the direction of the arrows 12—12 in FIG. 11, FIG. 13 is a partial horizontal sectional view taken in the direction of the arrows 13—13 in FIG. 12, and FIG. 14 is a vertical sectional view taken in the direction of the arrows 14—14 in FIG. 12.

As shown in FIGS. 1 and 2 the nuclear power plant comprises a pressure vessel 20 which contains from top to bottom a vapor separator 21, a nuclear reactor 22 including a core 23 and an annular reflector 24 disposed therearound, a centrifugal pump 25, a turbine 26, an electric generator 27, and a hydrogen compressor 28. Nuclear reactor 22 is a fast reactor employing boiling mercury as the coolant and turbine 26 is operated by mercury vapor in direct cycle with the reactor. Pressure vessel 20 is 404 cm. in length and 67.4 cm. in diameter. It is constructed of steel containing 5% chromium and ½% molybdenum which experience has shown will resist attack by mercury.

As shown in FIGS. 2, 6, and 7, core 23 comprises a plurality of fuel assemblies 29 each consisting of a plurality of fuel elements 30 having vertical coolant channels therebetween. Fuel assemblies 29 extend between and are supported and guided by grids 31 having openings 32 therein.

There are two types of fuel assemblies 29; hexagonal assemblies 29A and segmental assemblies 29B. Since the construction of the segmental assemblies 29B is substantially the same as that of the hexagonal assemblies 29A, only a hexagonal asembly will be described in detail by referring to FIGS. 6 and 7. A hexagonal assembly 29A comprises a plurality of elongated, spaced fuel elements 30, end grids 33 having openings 34 therein, corner fuel element extension 35, and adapter rings 36. Each hexagonal fuel assembly 29A has six corner fuel elements 30A at the corners thereof and 55 interior fuel elements 30B.

Adapter rings 36 are smaller in diameter than is the fuel assembly 29 and are adapted to fit into openings 32 in grids 31. Adapter rings 36 are welded to the inside of the ends of corner fuel element extensions 35. Elongated threaded bolts 37 attach extensions 35 to corner fuel elements 30A.

The details of a corner fuel elements 30A are shown in FIGS. 8 and 9. Corner fuel elements 30A comprise a tubular member 38 enclosing a fuel rod 39 and two end plugs 40 which have an end portion 41 of reduced diameter. End plugs 40 have threaded openings 42 therein which receive bolts 37. End portion 41 of end plugs 40 is adapted to fit in openings 34 in end grids 33.

Interior fuel elements 30B are identical to corner fuel elements 30A except that threaded openings 42 in end plugs 40 are not needed. All fuel elements 30 are provided with three equally-spaced, longitudinal ribs 43. Ribs 43 maintain the spacing of fuel elements 30 completely uniform throughout their length. Fuel elements 30 are maintained in the desired orientation by pins 44.

Tubular members 38 are 54.6 cm. in length and 0.84 cm. in outer diameter with a wall thickness of 0.03 cm. They are made of steel containing 5% chromium and ½% molybdenum. Fuel rods 39 are 0.76 cm. in diameter and 40.6 cm. in length and contain 356.5 grams of 35.6% enriched uranium in a matrix of uranium carbide.

There are 19 hexagonal fuel assemblies 29A in the core 23, each containing 61 fuel elements 30 arranged on a triangular lattice one cm. center to center. There are also six segmental fuel assemblies 29B, each containing 37 fuel elements 30. Segmental fuel assemblies 29B are distributed about the hexagonal fuel assemblies 29A to form core 23 which approximates the shape of a right circular cylinder 41 cm. in height and 41 cm. in diameter. The core thus contains a total of 1381 fuel elements with a total of 492 kilograms of 35.6% enriched uranium.

Control of the reactor is obtained by movement of annular reflector 24. Reflector 24 is split horizontally at its midpoint into upper and lower portions and vertically into four equal sections. Reflector 24 is disposed in an annular shell 45 which is located around the reactor core 23 and extends considerably above the top and below the bottom of the core. Lead screws 46 provided with oppositely oriented screw threads in the upper and lower portions thereof may be rotated by servo motors 47. (See FIG. 5.) Lead screws 46 pass through the center of each reflector section wherein the openings in the top and bottom portions of the reflector are oppositely oriented in the same way as are those on lead screws 46. Actuation of the servo motors to rotate the lead screws 46 in one direction causes the upper and lower portions of the reflector sections to separate while reverse operation causes them to come together. Control reflector 24 is of iron and contains cooling holes 48. (See FIGS. 2 and 4.) Each section of reflector 24 is about 7.6 cm. thick and 40.7 cm. in height.

Reflector 24 is of smaller diameter than is pressure vessel 20 leaving an annular space 49 at the periphery of the pressure vessel. Annular space 49 is separated by dividers 50 into relatively small channels 51 (FIG. 2) or liquid mercury and relatively large channels 52 for mercury vapor.

Referring again to FIG. 1, a separation plate 53 extends across presure vessel 20 between core 23 and pump 25. Separation plate 53 is spaced away from pressure vessel 20 by annular space 49 but it attached thereto by members 54 which close the bottom of small channels 51. Just above separation plate 53 is a support plate 54A on which reflector shell 45 rests. Pump outlet 55 of circulating pump 25 penetrates both plate 53 and plate 54A.

Turbine 26 is provided with inlet openings 56 near the top thereof and outlet openings 57 near the bottom thereof. Plate 58, located just below inlet openings 56, and plate 59, located just below outlet openings 57, extend entirely across the pressure vessel 20 and define between them turbine outlet plenum chamber 60. Turbine inlet plenum chamber 61 is located just above turbine outlet plenum chamber 60 and is defined by separation plate 53 and plate 58. Vapor risers 62 communicate with turbine outlet plenum chamber 60. Vapor risers 62 extend radially outwardly from the pressure vessel a distance amounting to several times their width as shown in FIG. 2. They communicate with vapor line 63 to the radiators. Lines 64 are provided to return liquid mercury to pump 25. These lines 64 enter the pressure vessel at the bottom thereof and extend upwardly along the periphery of the pressure vessel 20 to the pump 25.

In operation pump 25 forces liquid mercury upwardly through core 23 between fuel elements 30. In core 23 approximately 10% of the mercury is vaporized. The mixed vapor and liquid enter vapor separator 21 from which the mercury liquid returns to pump 25 through channels 51. Vapor passes downwardly through channels 52 to turbine inlet plenum chamber 61 and thus to turbine 26. Spent vapor leaves turbine 26 through turbine outlet plenum chamber 60 and passes through vapor riser 62 to the radiator. The vapor is condensed in the radiator as will hereinafter become apparent and liquid mercury is returned to pump 25 through liquid return lines 64.

Hydrogen gas is used to cool the reflector 24 and the generator 27. Referring now to FIGS. 1 and 4, hydrogen is admitted to presure vessel 20 by means of hydrogen inlet pipe 65, inlet annulus 66 which passes through pressure vessel 20 and pipes 67 which extend vertically upwardly along the periphery of the pressure vessel till they branch just above the top of generator 27, one branch 68 entering the generator 27 and the other branch 69 extending upwardly through vapor channel 52 to the top of reflector shell 45. The hydrogen leaves reflector shell 45 by pipe 70 (see FIG. 3) which extends downwardly through vapor channel 52 and along the periphery of the pressure vessel 20 to hydrogen compressor 28. Hydrogen gas also traverses pipe 71 in passing from generator 27 to hydrogen compresor 28. Compressed hydrogen is conducted to the radiator by outlet chamber 72 and outlet pipes 73.

Referring now to FIGS. 10 to 14, the radiator employed for condensing mercury vapor and cooling hydrogen gas will next be described. The radiator consists of four sections 75 which are disposed uniformly around the pressure vessel 20. Each section 75 consists of 25 concentric radiator elements 76a, b, c . . . y which in transit nest around the pressure vessel 20 and subtend the same arc. The radiator elements 76 consist of an arcuate inlet header 77 at the upper end, an arcuate outlet header 78 at the lower end, and a plurality of radiator tubes 79 connected between the headers. The innermost radiator element 76a is the shortest and contains the fewest radiator tubes 79 and the outermost radiator element 76y is the longest and contains the greatest number of radiator tubes 79. As shown in FIG. 10 a single section 75 of the radiator when collapsed for transportation nests, with elements 76 in contact, against the pressure vessel 20 between vapor risers 62.

Adjacent radiator elements 76 are connected at alternate ends by hinges 80. As shown in FIG. 13, hinges 80 are attached to structural channels 81 which are located at the ends of the radiator elements 76 to provide additional rigidity to the element.

Swivel joints 82 extend between adjacent inlet headers 77 and between adjacent outlet headers 78 at the same ends thereof as are hinges 80. As shown in FIG. 12, swivel joints 82 consist of adapter pieces 83 attached to adjacent header 77 or 78, U-tubes 84 having legs of different length, the longer leg being attached directly to an adapter piece 83, and a connecting tube 85 extending between the other adapter piece 83 and the shorter leg of the U-tube. Thus the radiator elements 76 can be rotated about the hinges 80 while the headers continue to remain in flow communication.

Innermost radiator element 76a is connected to the pressure vessel 20 by hinges 86.

Mercury vapor is conducted to inlet header 77 of the second innermost radiator element 76b from vapor riser 62 by vapor line 63. Liquid mercury is returned to pump 25 from outlet header 78 of radiator element 76a by mercury return line 64. It was found that liquid mercury could be returned to the reactor conveniently from the first radiator element 76a but vapor could not conveniently be conducted to the first radiator element 76a. Therefore vapor line 63 is flexible so that it will be bent when the radiator is folded and will straighten when the radiator is extended.

Hydrogen is cooled in the outermost section 76y of the radiator. Hydrogen is conducted to outermost radiator section 76y by line 86a and cooled hydrogen is returned by line 87. Header 78 at the bottom of section 76y is divided into a small inlet section 88 and a large outlet section 89 by a barrier 90. Thus hydrogen first flows upwardly through radiator tubes 79 from header 78 to 77 and then downwardly back to header 78 and line 87. These lines are extended in FIG. 12 and folded between radiator sections 75 in FIG. 10.

As shown in FIG. 13, each radiator tube 79 is provided with a pair of heat transfer fins 91 which extend radially outwardly from the tube on opposite sides thereof.

Each radiator section 75 contains eight sets of adjustable telescopic bipod support braces 92 equispaced along the length of the radiator section. One pair of braces 92 is connected near the top of a support member 93 extending between headers 77 and 78 and another pair is connected near the bottom thereof. These braces are folded and occupy the space of one radiator tube 79 in transit.

FIGS. 10 to 12 also illustrate how a radiator section 75 is opened. A conveyor rail 94 is attached to a swivel 95 at the top of the pressure vessel. This rail is hinged for storage during transit and is opened at the site. A series of bipod supports 96 provide lateral bracing. Roller assemblies 97 provided with a hanging bar 98 are connected to sockets 99 on the outside of the inlet radiator header 77 as the radiator is pulled out on the conveyor. After pulling out one radiator section 75 the conveyor hanging bars 98 are disconnected and the conveyor moved 90° to the next radiator section 75. This same method is used for the third and fourth sections.

It will be understood that the invention is not to be limited to the details given herein but that it may be modified within the scope of the appended claims.

What is claimed is:

1. A compact, easily transportable, nuclear power plant comprising a boiling-mercury reactor, mercury-vapor turbine in direct cycle with said reactor, a generator for electricity operated by said turbine, and a radiator for condensing spent mercury vapor exhausted by said turbine comprising a plurality of arcuate concentric radiator elements of progressively increasing radius and length, as the distance from the reactor increases, hinges connecting one end of the innermost radiator element to the reactor, hinges and swivel connections connecting alternate ends of adjacent radiator elements, said swivel connections placing the radiator elements in flow communication, and means for conducting spent mercury vapor from the turbine to the radiator and for returning liquid mercury to the reactor.

2. A compact, easily transportable, nuclear power plant comprising a nuclear reactor which includes a plurality of fuel elements having vertical coolant channels therebetween, an annular reflector having coolant channels therein and including an upper and a lower section disposed around the fuel elements, means for varying the distance between said upper and lower sections, a pump for pumping liquid mercury upwardly through the vertical channels between the fuel elements, the nuclear reactor being operated under such conditions of temperature and pressure that the mercury boils therein, a vapor separator disposed above the fuel elements, means for returning liquid mercury from the vapor separator to the pump, a mercury-vapor turbine disposed below said pump, means for conducting mercury vapor from said vapor separator to said turbine, an electric generator operated by said turbine and disposed therebelow, a hydrogen compressor disposed below said generator, means for conducting hydrogen gas from the hydrogen compressor to the coolant channels in the reflector and through the electric generator, means for condensing spent mercury vapor and for cooling hydrogen gas, means for conducting condensed mercury to the pump, and means for conducting cooled hydrogen to the hydrogen compressor.

3. A compact, easily transportable, nuclear power plant comprising a nuclear reactor which includes a plurality of fuel elements having vertical coolant channels therebetween, an annular reflector having coolant channels therein and including an upper and a lower section disposed around the fuel elements, means for varying the distance between said upper and lower sections, a pump for pumping liquid mercury upwardly through the vertical channels between the fuel elements, the nuclear reactor being operated under such conditions of temperature and pressure that the mercury boils therein, a vapor separator disposed above the fuel elements, means for returning liquid mercury from the vapor separator to the pump, a mercury-vapor turbine disposed below said pump, means for conducting mercury vapor from said vapor separator to said turbine, an electric generator operated by said turbine and disposed therebelow, a hydrogen compressor disposed below said generator, means for conducting hydrogen gas from the hydrogen compressor to the coolant channels in the reflector and through the electric generator, four radiator sections equispaced around the reactor, each radiator section comprising a plurality of arcuate concentric radiator elements of progressively increasing radius and length as the distance from the reactor increases, each radiator element consisting of a horizontal, arcuate upper header, a horizontal, arcuate lower header, and a plurality of vertical tubes extending therebetween, hinges connecting one end of the innermost radiator element to the reactor, hinges and swivel connections connecting alternate ends of adjacent radiator elements, said swivel connections placing the radiator elements in flow communication, means for conducting spent mercury vapor from the turbine to the second segment of the radiator away from the reactor, means for conducting condensed mercury from the radiator to the pump, means for conducting hydrogen gas from the reflector and generator to the outermost radiator element, and means for returning cooled hydrogen gas to the hydrogen compressor.

References Cited in the file of this patent

UNITED STATES PATENTS

| | | |
|---|---|---|
| 2,105,751 | Money | Jan. 18, 1938 |
| 2,706,105 | Young | Apr. 12, 1955 |
| 2,982,712 | Heckman | May 2, 1961 |
| 2,999,059 | Treshow | Sept. 5, 1961 |
| 3,049,487 | Harrer et al. | Aug. 14, 1962 |

OTHER REFERENCES

Proceedings of the Second U.N. International Conf. on the Peaceful Uses of Atomic Energy, vol. 9 (1958), pp. 455–467.